United States Patent [19]

Bernier

[11] Patent Number: 4,858,419
[45] Date of Patent: Aug. 22, 1989

[54] SWATH TREATING ATTACHMENT FOR A SWATHER

[76] Inventor: Paul Bernier, Box 414, Fisher Branch Manitoba, Canada, R0C 0Z0

[21] Appl. No.: 250,070

[22] Filed: Sep. 28, 1988

[30] Foreign Application Priority Data

Sep. 30, 1987 [GB] United Kingdom ............... 8722941

[51] Int. Cl.$^4$ ............................................ A01D 75/00
[52] U.S. Cl. ....................................... 56/189; 56/192
[58] Field of Search ......................... 56/192, 189, 190

[56] References Cited

U.S. PATENT DOCUMENTS

| | | | |
|---|---|---|---|
| 1,144,679 | 6/1915 | Akers | 56/187 |
| 1,844,860 | 2/1932 | Lindgren | 56/192 |
| 1,968,683 | 7/1934 | Hanson | 56/192 |
| 3,731,468 | 4/1973 | Blumhardt | 56/1 |
| 3,803,821 | 4/1974 | Peacock et al. | 56/192 |
| 4,217,746 | 8/1980 | Cicci et al. | 56/192 |
| 4,330,982 | 5/1982 | Vissers | 56/192 |
| 4,532,941 | 8/1985 | Gauthier | 56/192 |
| 4,702,062 | 10/1987 | Phelau | 56/192 |

FOREIGN PATENT DOCUMENTS

| | | |
|---|---|---|
| 599761 | 6/1960 | Canada . |
| 941622 | 2/1974 | Canada . |
| 966649 | 8/1964 | United Kingdom ................ 56/189 |

Primary Examiner—John Weiss
Attorney, Agent, or Firm—Adrian D. Battison; Stanley G. Ade; Murray E. Thrift

[57] ABSTRACT

An attachment for a swather comprises a panel which is hinged at a front edge on the swather so as to hang downwardly and rearwardly therefrom so that rear edge engages and compresses the swath as it emerges from the swather. The panel is spring biased downwardly to compress the swath into the stubble to reduce the danger of wind damage in fluffy crops such as flax. Side edges of the panel include spring tines extending outwardly from the rear edge so as to compress the swath particularly at side edges of the swath with a center section of the panel bowed upwardly to reduce the compression action in that area.

5 Claims, 2 Drawing Sheets

SWATH TREATING ATTACHMENT FOR A SWATHER

BACKGROUND OF THE INVENTION

This invention relates to a swath treating attachment for a swather and to a swather including such an attachment.

Swathers are arranged to cut a standing crop and to confine that crop into a narrow row or swath of the crop material which is laid on the stubble behind the swather as the swather moves forwardly across the ground.

One problem which arises with swathers in relation to fluffy or high bulk crops such as alfalfa, canola and flax is that the swath is not in any way compressed and tends to stand high on the stubble thus making it very sucsceptible to blowing or moving in the wind. One solution to this problem is to attach a swath roller behind the swather so that it is pulled across the ground behind the swather and runs along the swath to assisting compressing or condensing the swath onto the ground and into the stubble to make it more resistant to wind damage. Swath rollers of this type are shown for example in U.S. Pat. No. 3,731,468 (Blumhardt) and Canadian Patent No. 599,761 (Hellegards). Such rollers are however a major problem in the handling of the swather in that it becomes impossible or very difficult to reverse the swather or to change direction while the roller remains properly positioned on the swath. There is a great resistance from the farmer therefore to use devices of this type.

A number of devices have been proposed previously for mounting at the rear of a swather for guiding the formation of the swath into various different shapes and examples of these devices are shown in Canadian patent No. 500,670 (Russell) and U.S. Pat. Nos. 3,803,821 (Peacock) and 4,217,746 (Cicci). These devices do not however solve the problem set forth. U.S. Pat. No. 4,532,941 (Gauthier) discloses a deflecting device for straw issued from a combine. U.S. Pat. Nos. 1,144,679 (Akers) and 1,844,860 (Lindgern) disclose swathers of the type in which the header can be lifted but are not relevant to the present problem.

SUMMARY OF THE INVENTION

It is one object of the present invention, therefore, to provide an improved device for attachment to a swather which will assist in treating the swath so that it is properly confined and resistant to wind damage.

According to a first aspect of the invention, therefore there is provided a swath treating attachment for a swather comprising a panel member, hinge means on the panel member for attachment of a forward portion of the panel member to the swather for movement therewith and for pivotal movement relative thereto about a substantially horizontal axis transverse to the direction of movement of the swather, the panel member having an undersurface thereof arranged to engage the swath formed by the swather as it lies on the stubble, and means for biasing the panel member downwardly into contact with the swath to compress the swath into the stubble.

According to a second aspect of the invention, therefore, there is provided a swather comprising a swather frame, a header mounted on the frame for cutting a standing crop and for forming the cut crop into a swath discharged from a rear discharge opening of the swather frame and a swath treating attachment for comprising a panel member, hinge means on the panel member mounting a forward portion of the panel member on the swather for movement therewith and for pivotal movement relative thereto about a substantially horizontal axis transverse to the direction of movement of the swather, the panel member having an undersurface thereof arranged to engage the swath formed by the swather as it lies on the stubble, and means for biasing the panel member downwardly into contact with the swath to compress the swath into the stubble.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
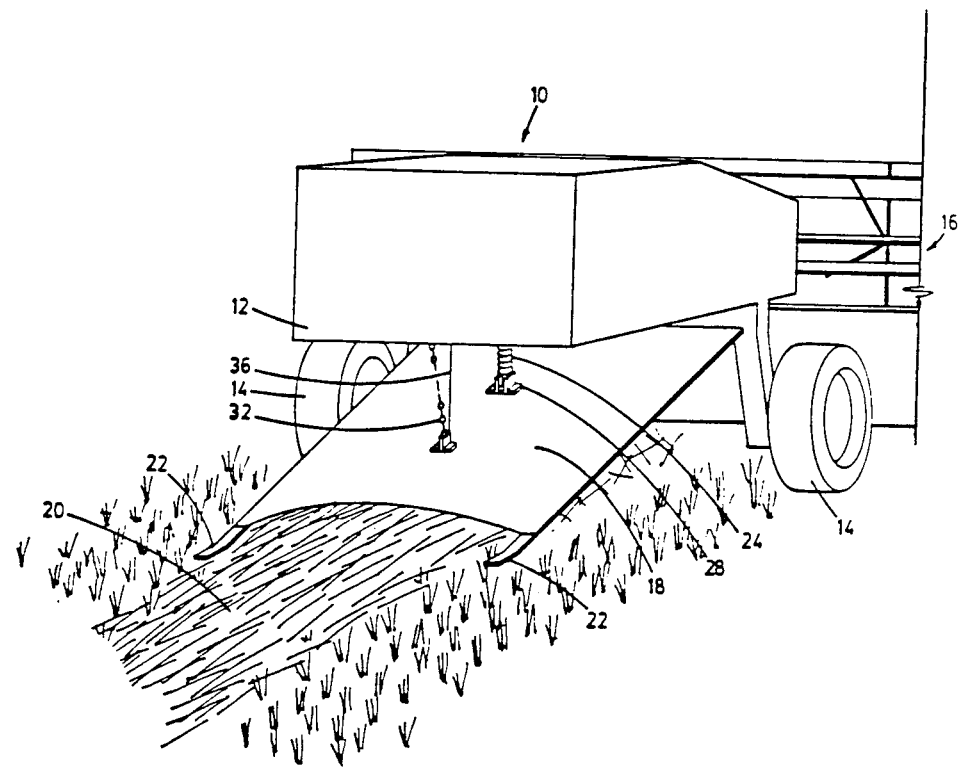
FIG. 1 is an isometric view of a swather including an attachment according to the invention.

Referring to the drawings, in particular to FIG. 1, there is illustrated a swather 10 of conventional type including a header for cutting a standing crop and crop condensing arrangements, generally drapers, which convey the cut crop to a discharge opening. The swather has a platform 12 supported by wheels 14 and carrying the crop cutting and swathing header 16 at its front end.

The swather is also provided with a swath setting panel 18 that is pivotally mounted on the swather frame and slopes down to the rear from the frame to engage the top of the swath 20 that has been deposited on the stubble from the discharge opening of the swather. The panel 18 is generally rectangular in plan with a front edge at a hinge line, a rear edge for engaging the swath and side edges spaced by an amount at least equal to the width of the swath. The panel 18 has a pair of flat spring tines 22 and projecting outwardly from the rear edge at a respective one of the side edges to engage the ground or edge of the swath as a pair of runners or skids. The panel itself is arched upwardly at the rear edge in the centre so that the swath will have a similar arched shape when set. The amount of the arch reduces from the rear edge forwardly to the front edge which is straight at the hinge line.

Figure 2:
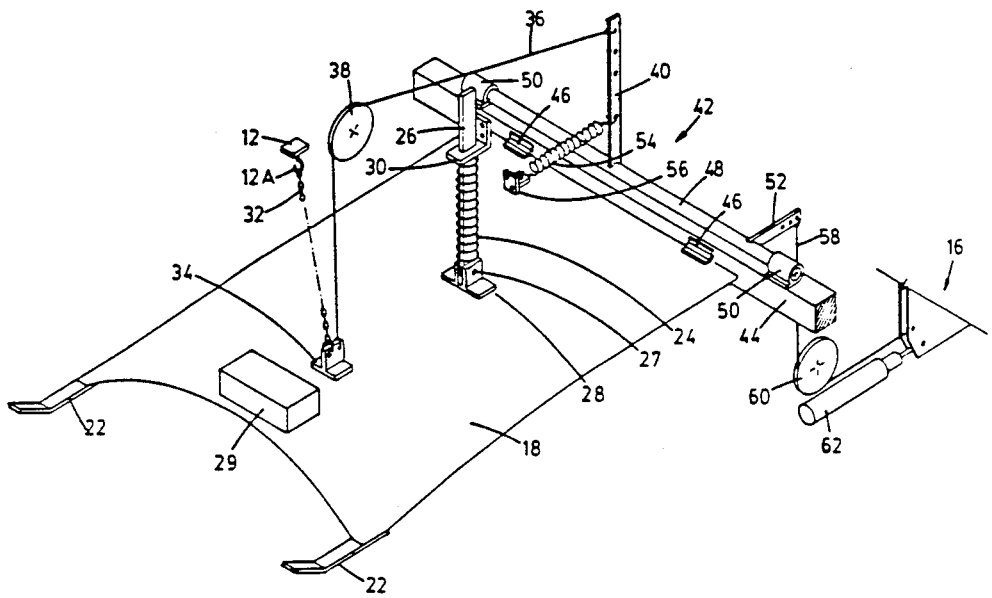
FIG. 2 is a schematic isometric view showing the linkage by which a lifting action of the attachment is obtained.
Figure 3:
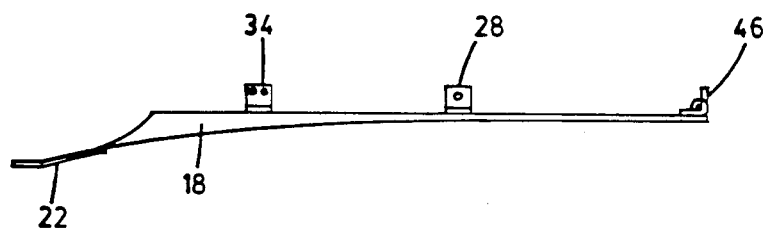
FIG. 3 is a side elevational view of the attachment of the FIG. 1.

To maintain the panel 18 in engagement with the top of the swath, a spring 24 joins the top of the panel to the swather frame and biases the panel 18 downwardly. the spring is retained in position by a bar 26 (see FIG. 2) that is coupled by a pivot pin 27 to a bracket 28 on the top of the panel 18 and slides through a hole in a bracket 30 fixed to the platform 12 of the swather 10. The spring 24 extends between the two brackets to bias the panel 18 downwards at all times. In addition a weight 29 can be attached to the panel to increase the downward force on the panel.

A chain 32 is provided which has one end secured to a bracket 34 fixed to the panel behind the bracket 28 and the other end fixed to the platform of the swather 10. The chain is generally loose so that it does not confine the movement of the panel. However the chain can be latched at a raised position by hooking one link of the chain over a loop 12A on the platform 12 of the swather.

The panel 18 can also be raised by a cable 36 with one of its ends secured to the bracket 34 on the panel 18. The cable 36 extends from bracket 34, around a pulley 38 mounted on the frame of the swather and to a lever 40 pivotally mounted on a cross-bar 44 of the swather frame. The panel 18 is pivotally mounted on the cross-bar 44 of the swather frame by two hinges 46.

The lever 40 is fixed to one end of a shaft 48 mounted for rotation on the frame bar 44 by two bearings 50, while a second lever 52 is secured to the shaft adjacent an opposite end. The two levers 40, 52 are angularly displaced with respect to one another. The levers are biased in a counter clockwise direction that is towards the lowered position of the panel 18 by a tension spring 54 connected at one end to lever 40 and at its opposite end to a bracket 56 in turn fastened to the frame of the swather. A further cable 58 is connected at one end to the lever arm 53 and passes from the lever arm around a pulley 60 and to an anchorage on the header 16. The header, as is usual with swathers, is raised and lowered by an hydraulic cylinder 62.

In this way, lifting of the header by the conventional actuating mechanism into an inoperative position automatically causes lifting of the panel to a raised inoperative position. When the panel is manually raised and latched by the chain, the cable 58 is maintained tensioned by the spring 54 so as to avoid interfering with the operation of the header.

The shape of the panel 18, as shown, is flat in transverse cross-section adjacent the hinges 46 and gradually becomes upwardly arcuate towards the trailing end.

When the attachment is out of use, it is drawn up under the platform of the swather 12 and hooked in place so that regardless of the position of the header 16, the attachment stays out of use. When the attachment is in use, it is unhooked and its position will be governed by the position of the header. When the header is raised by extending cylinders 62, the cable 58 is drawn around the pulley 60 to turn the lever arm 52, the shaft 48 and the lever arm 40 as a unit in their bearings 50. This in turn draws the cable 36 around the pulley 38 to raise the panel 18. When the header is lowered by retracting the cylinder 62, the opposite action occurs, with the springs 54 and 24 acting to urge the lever arm 40 and the panel 18 directly to their in-use positions.

The spring tines 22 act to most vigorously compress the swath at its outermost edges to ensure that it is most resistant to wind movement. The greater mass of the swath at its center is accommodated by the bowed rear edge of the panel.

The mounting of the panel directly on the swather and its latching action in the raised position ensure that manoeuverability of the swather is not reduced when the header is raised and that the operator can lift it fully out of position when swath conditions do not require its use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only an not in a limiting sense.

I claim:

1. A swather comprising a swather frame, a header mounted on the frame for cutting a standing crop and for forming the cut crop into a swath discharged from a rear discharge opening of the swather frame and a swath treating attachment comprising a panel member having a front edge, a pair of sides and a rear edge, hinge means on the panel member adjacent said front edge mounting a forward portion of the panel member on the swather frame for movement of the panel member with the swather frame and for pivotal movement of the panel member relative to the swather frame about a substantially horizontal axis transverse to the direction of movement of the swather, a pair of ground engaging members on said panel member each at a respective side thereof, biasing means on said panel member arranged to apply a force downwardly on the panel member tending to move the panel member downwardly about the horizontal axis to hold said ground engaging members in contact with the ground while allowing the panel member to floatingly pivot upwardly about the axis as ground level changes relative to the swather frame, the panel member having a substantially rigid undersurface thereof arranged to engage the swath formed by the swather as it lies on the stubble to compress the swath into the stubble, a rear edge of the panel member being bowed such that a center portion thereof is raised above said sides thereof, and means for lifting the panel member against the force of the biasing means away from the ground.

2. The invention according to claim 1 including means for latching the panel member in a lifted condition thereof.

3. The invention according to claim 1 including means for coupling the panel member to the header such that a lifting action of the header causes lifting of said panel member.

4. The invention according to claim 1 wherein the ground engaging members each extend from the rear edge at a position adjacent a respective one of the side edges such that the ground engaging member is arranged to contact the ground at the respective side edge and to hold the rear edge of the panel member at a position spaced above the ground.

5. The invention according to claim 4 wherein said engaging members comprise a pair of spring tines having flat sides thereof for acting as runners against the stubble.

* * * * *